(12) United States Patent
Iwema et al.

(10) Patent No.: US 7,870,501 B2
(45) Date of Patent: Jan. 11, 2011

(54) METHOD FOR HOLLOW SELECTION FEEDBACK

(75) Inventors: Marieke Iwema, Seattle, WA (US);
Shawna Davis, Seattle, WA (US);
Robert J. Jarrett, Snohomish, WA (US); F. David Jones, Redmond, WA (US); Guy Barker, Kirkland, WA (US);
Bodin Dresevic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 11/067,949

(22) Filed: Mar. 1, 2005

(65) Prior Publication Data

US 2005/0149882 A1 Jul. 7, 2005

Related U.S. Application Data

(62) Division of application No. 10/144,256, filed on May 14, 2002.

(51) Int. Cl.
*G06F 3/048* (2006.01)
(52) U.S. Cl. ........................ 715/767; 715/772; 715/823; 715/837
(58) Field of Classification Search ................ 715/767, 715/772, 802, 821–823, 837, 860, 861
See application file for complete search history.

(56) References Cited

U.S. PATENT DOCUMENTS

| 5,339,387 A | | 8/1994 | Frankel |
| 5,410,331 A | | 4/1995 | Schuneman |
| 5,442,742 A | * | 8/1995 | Greyson et al. ............. 715/210 |
| 5,459,831 A | * | 10/1995 | Brewer et al. ............... 715/853 |
| 5,577,170 A | | 11/1996 | Karow |
| 5,631,975 A | * | 5/1997 | Riglet et al. ................ 382/173 |

(Continued)

FOREIGN PATENT DOCUMENTS

EP 0454477 A 10/1991

(Continued)

OTHER PUBLICATIONS

Morgan N. Price et al., "Linking by Inking: Trailblazine in a Paper-like Hypertext", HyperText 98, 1998, 10 pages.

(Continued)

*Primary Examiner*—Ba Huynh
(74) *Attorney, Agent, or Firm*—Shook, Hardy & Bacon L.L.P.

(57) ABSTRACT

An improved approach to highlighting a graphical object in a graphical user interface is disclosed. A body of a highlighted graphical object may, upon selection or highlighting, be changed to a transparent color, and a graphical outline, or "halo," is added surrounding the original graphical object's body. The halo may be in the same color as the graphical object originally was, preserving any meaning attributed to the color of the graphical object and simplifying the user's ability to identify the selected object(s), as well as the ability to select the highlighted object for further processing. The highlighted graphical object may also be displayed with a bounding box to further identify the selected object(s). A moving version of the highlighted graphical object may be drawn during a moving process, in which the moving version has an appearance distinct from the original object.

12 Claims, 18 Drawing Sheets

U.S. PATENT DOCUMENTS

| | | | |
|---|---|---|---|
| 5,977,981 A | | 11/1999 | Brown |
| 5,982,381 A | * | 11/1999 | Joshi et al. .................. 345/629 |
| 6,057,858 A | * | 5/2000 | Desrosiers ................. 345/467 |
| 6,091,505 A | | 7/2000 | Beaman et al. |
| 6,243,093 B1 | * | 6/2001 | Czerwinski et al. ......... 715/848 |
| 6,337,698 B1 | | 1/2002 | Keely, Jr. |
| 2001/0020956 A1 | * | 9/2001 | Moir .......................... 345/765 |
| 2002/0046386 A1 | | 4/2002 | Skoll et al. |
| 2002/0064308 A1 | * | 5/2002 | Altman et al. .............. 382/187 |
| 2008/0072168 A1 | * | 3/2008 | Conway et al. ............. 715/764 |
| 2008/0155439 A1 | * | 6/2008 | Stern et al. .................. 715/769 |

FOREIGN PATENT DOCUMENTS

| | | |
|---|---|---|
| WO | 0225211 A | 3/2002 |

OTHER PUBLICATIONS

European Search Report dated Nov. 7, 2007 for European Patent Application Serial No. EP 03 00 8066, 2 Pages.

* cited by examiner

METHOD FOR HOLLOW SELECTION FEEDBACK

CROSS REFERENCE TO RELATED APPLICATIONS

The present application is a divisional application of U.S. application Ser. No. 10/144,256, filed May 14, 2002, entitled "Method and Apparatus for Hollow Selection Feedback," the specification of which is hereby incorporated by reference.

FIELD OF THE INVENTION

The present invention relates generally to graphical user interfaces. Specifically, aspects of the present invention relate to providing an indication to a user that certain graphical objects have been selected and/or highlighted. Further aspects of the present invention allow users to manipulate the selected graphical objects.

BACKGROUND OF THE INVENTION

A picture is worth a thousand words. The sentiment echoes throughout various aspects of our lives, and the world of computing is no exception. Since its inception, graphical user interfaces (GUIs) have become the standard, and preferred, way for millions of computer users to interact with their computers. Accordingly, more and more importance is being placed on the way in which computers visually show the user's actions and the environment in which the user may take these actions.

The typical GUI uses a number of onscreen graphical objects to visually represent functions, applications, files, menus, and a host of other features for the computing environment. The user typically uses a mouse input device to move an onscreen pointer to select a particular graphical object for action.

This GUI has proven effective, but a new step in the evolution of computing has revealed several drawbacks to existing GUIs. Specifically, the introduction of pen-based computing devices, such as the hand-held Personal Data Assistant (PDA) or the Tablet PC being introduced by Microsoft Corp., has changed the way we view the GUI, and the manner in which users can interact with their computers. This new approach to user interfaces has revealed problems and deficiencies in the traditional GUI described above. Examples of these problems will be discussed below.

One common use of computers and GUIs is to generate and edit electronic documents. These electronic documents can contain text (e.g., electronic word processors) and/or images (e.g., pictures), which are displayed on the user's screen for editing. To interact with these onscreen objects, the user typically uses a mouse input device to move an onscreen pointer to the desired object, and presses a button on the mouse to select the object.

The selection of the particular object may be reflected in a change in its appearance. For example, electronic word processing programs, such as the MICROSOFT WORD (R) program, may display text as shown in FIG. 16. In FIG. 16, the text "Sample text" appears in black on a white background. The text is arranged automatically in uniform rows of text across the user's screen, where the rows of text are assigned a predefined height based on user-defined settings (e.g., the use of 10 pt. font, the line spacing, etc.). Upon selecting these words using, for example, a click-and-drag motion of the mouse pointer over the words, their appearance may change to that shown in FIG. 17. In this figure, the actual selected text is now given a white color, and the rectangular area inhabited by the text in the row is given a black background that serves as a blocked selection highlight, identifying the selected text. The black blocked selection highlight occupies the entire row height, and serves to differentiate the selected text from the non-selected text.

Although this prior art approach to highlighting text works well in the uniform, line-by-line environment of traditional word processors, this approach is less desirable in other environments that allow a greater degree of freedom, such as pen-based computing devices. For example, in systems where the text is handwritten (e.g., on a personal data assistant using a touch-sensitive screen), the user may be permitted to write text above and below any such regimented lines. FIG. 18 shows an example of handwritten text that does not conform to any such lines. The "blocked" approach discussed above would result in some confusion as to what is actually selected.

A further drawback to this type of selection highlighting lies in the colors used for the selection block, and for the selected text appearing in the block. Although users of word processing programs are often provided with the ability to select font colors and/or background colors, they are not provided with the ability to select the color to be used for the selection block highlight, nor are they offered the ability to select the color of the selected text. Instead, these word processing programs automatically use predetermined colors for the selection block and selected text, which are often entirely different colors from the font color and background color. By using these new colors, these word processing programs may inadvertently obliterate any meaning that had been assigned to the original font color. For example, if a user were accustomed to using a red font color to identify text added by a certain person, and this color were changed upon selection of the text, the user might then be unable to tell whether the selected text was originally red or not.

The prior art approach to highlighting images, as opposed to the regimented text of traditional word processors, does not offer much of a better solution. FIGS. 19a,b show examples of how an image, such as a simple diagonal line, may appear when selected. If the line is a simple vector line created, for example, using a line drawing option available in Microsoft VISIO (r), the selected line's only change in appearance is the addition of selection handles 1901 at the endpoints. If the line is an image, such as a bitmap image, its appearance upon selection changes with the addition of a selection box with handles 1901 located around the periphery of the image. There are drawbacks to each of these approaches. In the former, the mere addition of handles 1901 does not clearly indicate the selected graphical object. In the latter, the selected line image may be identified by the surrounding box and handles, but there is much wasted white space attributed to this selected line. This white space is wasteful, as it obscures more visual "real estate," or displayable area of the GUI, than is necessary.

Accordingly, there is now a need for an improved approach to identifying selected graphical objects in a GUI environment that can overcome one or more of the deficiencies identified above.

SUMMARY OF THE INVENTION

Embodiments of the present invention may solve one or more of the problems and/or deficiencies identified above. In one aspect, a graphical object may appear in one color (or pattern) against a background of another color (or pattern). To highlight the graphical object, its body may be changed to a predetermined background color (such as white), or changed in color to appear transparent, allowing the color or pattern of the underlying background to show. A "halo" is displayed around the periphery of the graphical object, where the halo is displayed in a color (or pattern) matching the graphical object's original color or pattern. In further aspects, the halo may have a change in transparency or darkness of the color or pattern, allowing for a "glowing" appearance.

In some embodiments, the halo follows the contours of the outer periphery of the original graphical object. In further embodiments, the halo follows the exact contour of the outer periphery of the original graphical object. In yet further embodiments, the halo may be of a predetermined, constant, thickness.

In further embodiments, the highlighted graphical object may also be surrounded with a bounding shape, such as a rectangle. In yet further embodiments, the bounding shape may include selection handles.

In some embodiments, selection of the halo by the user may result in the selection of the graphical object.

In some embodiments, the highlighted graphical object may be moved to a different location on the graphical user interface. In further embodiments, a separate, moving version of the graphical object may be displayed to follow the movement of the graphical object. In yet further embodiments, the moving version of the graphical object may be drawn in a fainter color and/or pattern than the original graphical object. In further embodiments, the moving version of the graphical object may include a bounding box. In still further embodiments, the bounding box of the moving version of the graphical object may follow the outer contour of the graphical object.

In some embodiments, the halo retains its color and/or pattern as the graphical object is moved from a first area of the GUI, having a first pair of foreground/background colors, to a second area of the GUI having a different pair of foreground/background colors.

In further embodiments, the graphical object may have a varying thickness that, upon highlighting, is changed to a constant thickness, which simplifies the processing required to render the highlighted object.

In yet further embodiments, the halo may be rendered using a plurality of graphical layers. In some embodiments, the halo may be rendered by overlaying a duplicate of the halo over an enlarged duplicate of the halo, where the first duplicate is of a different color. In further embodiments, the halo may be rendered by overlaying a plurality of enlarged duplicates of the object, where each of the enlarged duplicates is of a slightly different size and color.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

I. Example Hardware

Figure 1:
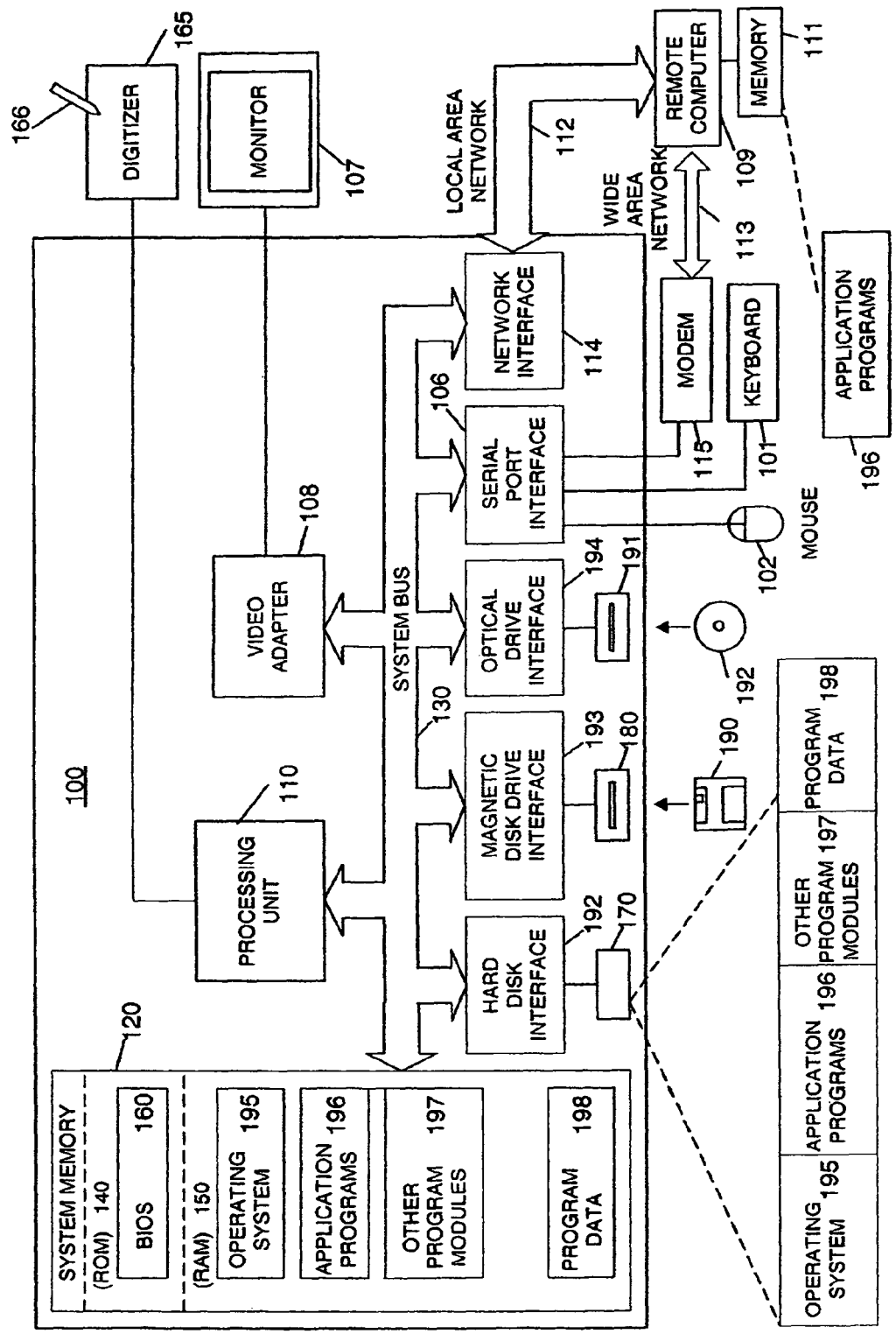
FIG. 1 shows a schematic diagram of a conventional general-purpose digital computing environment in which one or more embodiments of the present invention may be implemented.

The present invention may be more readily described with reference to FIGS. 1-21. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an example environment, it will be understood that other computing environments may also be used. For example, one or more embodiments of the present invention may use an environment having fewer than all of the various aspects shown in FIG. 1 and described above, and these aspects may appear in various combinations and subcombinations that will be apparent to one of ordinary skill.

Figure 2:
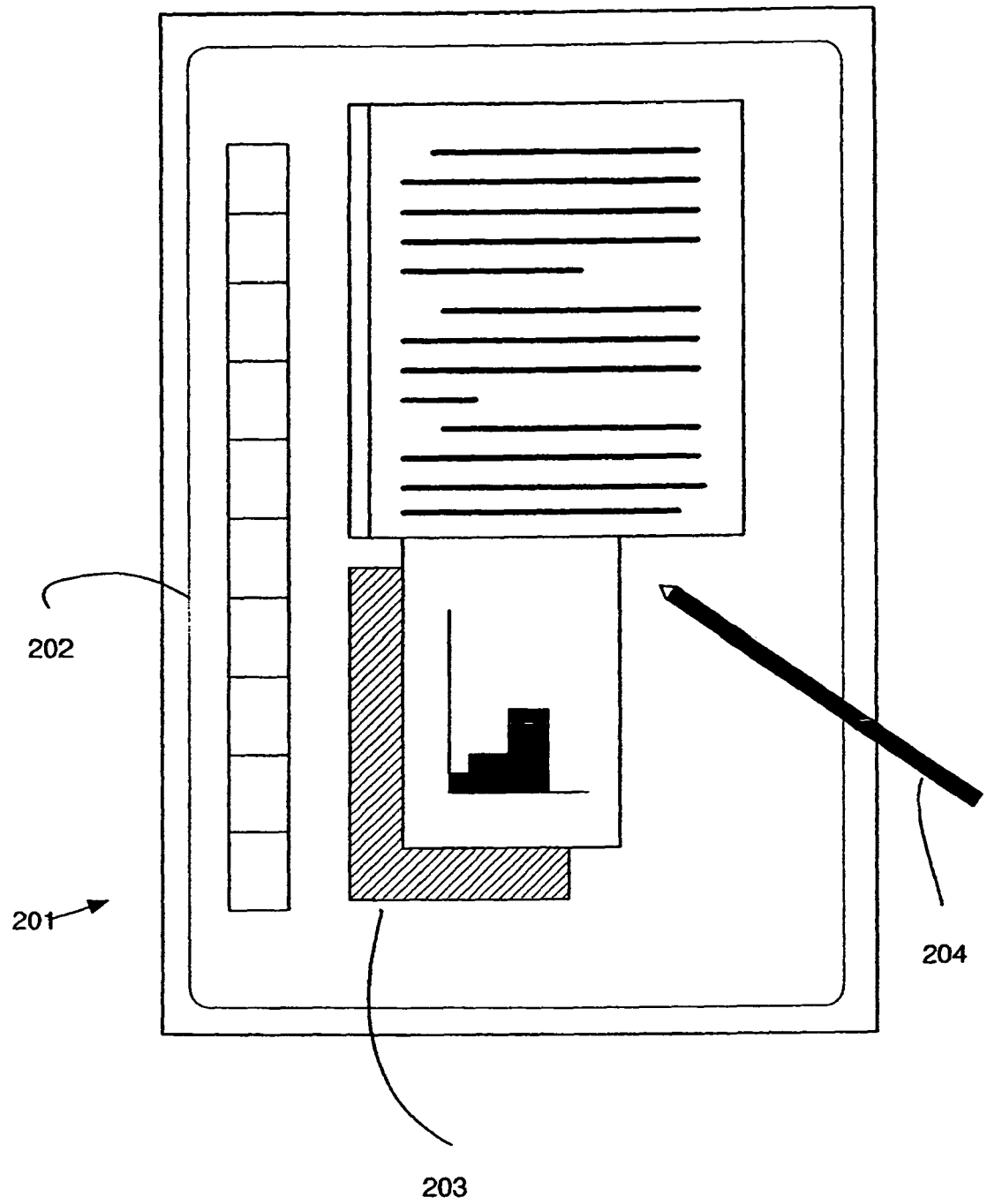
FIG. 2 shows a tablet personal computing (PC) environment in which one or more embodiments of the present invention may be implemented.

FIG. 2 illustrates a tablet personal computer (PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

II. Example Highlighted Graphical Objects

Figure 3:
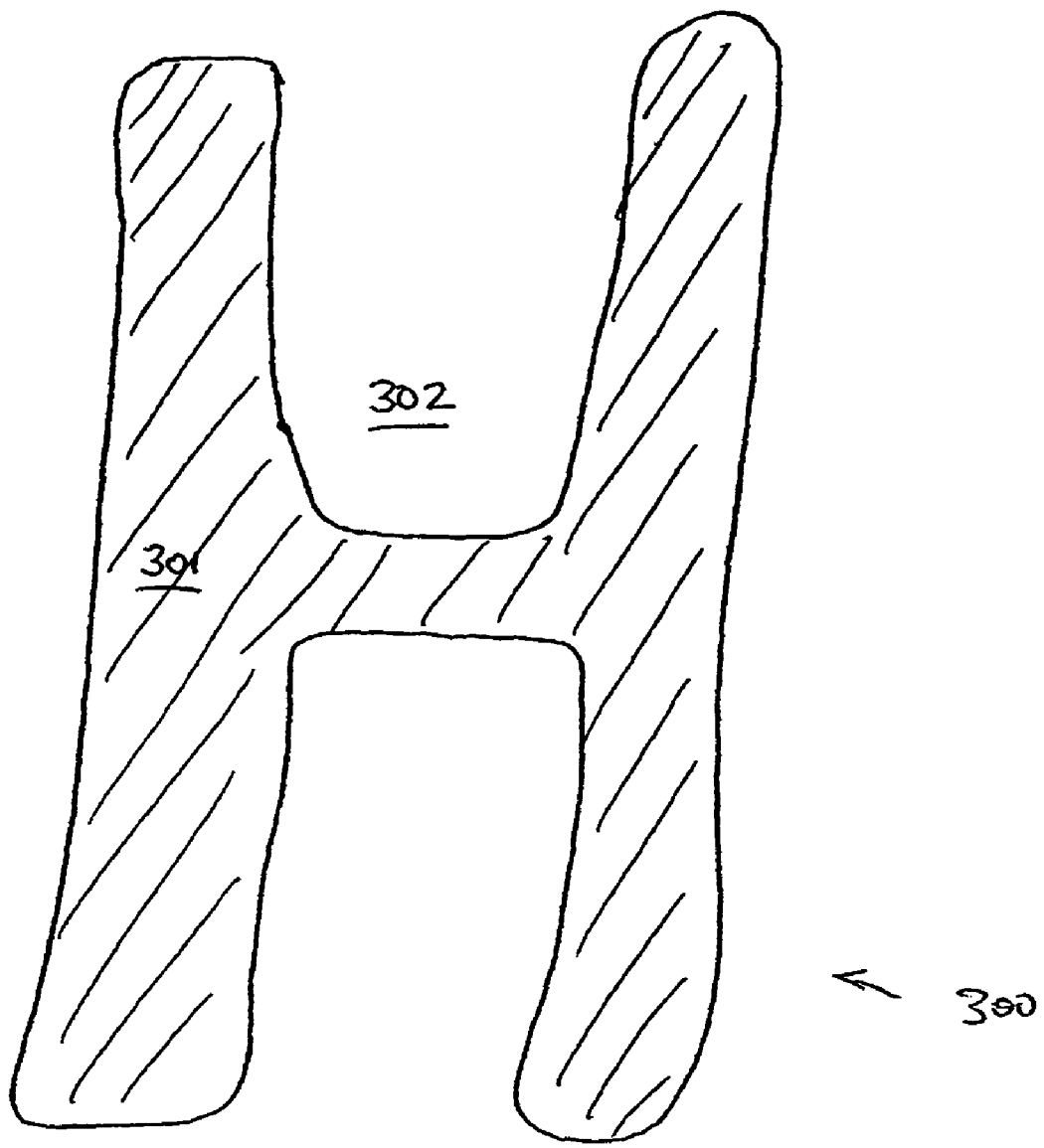
FIG. 3 shows an example of a graphical object usable in one or more embodiments of the present invention.

Anything appearing on a graphical user interface may be considered to be a graphical object, and FIG. 3 shows an example of such a graphical object. The graphical object 300 is a handwritten version of the letter 'H' that, for example, is captured as digitized ink using a pen-based computer and its stylus. Other types of graphical objects include graphical icons, images, symbols, menus, prompts, and text.

The body 301 of graphical object 300 may be drawn, or rendered, using any color or pattern value (e.g., hatched, shaded, a series of colors, etc.), and may be drawn on a background of a different color or pattern. In the FIG. 3 example, the background 302 is a simple solid white background, but any other color and/or pattern may be used as the background 302. The background 302 may also be comprised of one or more other graphical objects.

For example, the background may include a series of parallel horizontal (or vertical) lines to assist the user in keeping handwritten text in line. The object need not be constrained to such lines, however, and may simply overlap 1, 2, 3 or more of them.

The background may also include various other objects, such as text, images, drawings, handwriting, etc.

The graphical object 300 may become highlighted to represent that it has been selected, or to otherwise draw attention to it. This may occur in any number of ways. For example, in a pen-based computing device, the user may position the stylus over the displayed graphical object to select the object. The user may move a pointer over the graphical object to select it, and may also press a button to select it. Any other known method for selecting a graphical object in a GUI will also suffice.

When the graphical object is to be highlighted, its appearance changes. The body 301 may have its color value changed to a transparent value, such that the background 302 becomes visible in the area previously occupied by the body 301. The highlighted graphical object may also have an outline, or "halo" 401, of additional color and/or pattern drawn around its periphery, surrounding the original body 301 of the graphical object. Thus, as an example, a graphical object in a first color/pattern (e.g., red) on a background of a second color/pattern (e.g., black striped) will, upon selection, be changed in appearance to have a halo in the first color/pattern (i.e., red), and a body in the second color/pattern (i.e., black striped) due to its transparency. In alternative embodiments, the body 301 of the graphical object may have its color changed to a predetermined color, such as white, rather than a transparent color. The use of a predetermined color may advantageously simplify the processing required to render the highlighted graphical object.

Figure 4:
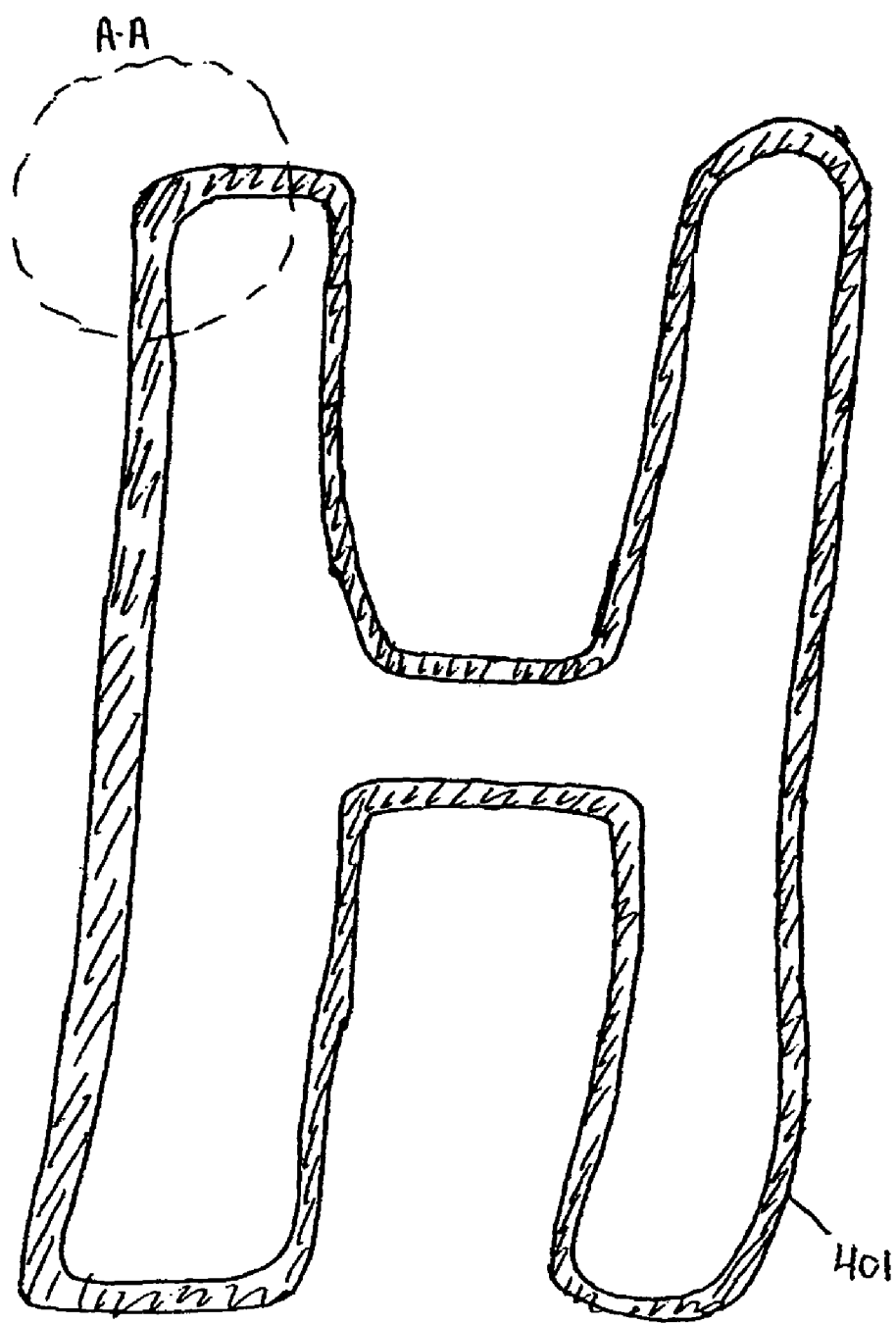
FIG. 4 shows an example highlighted graphical object according to one embodiment of the present invention.
Figure 5:
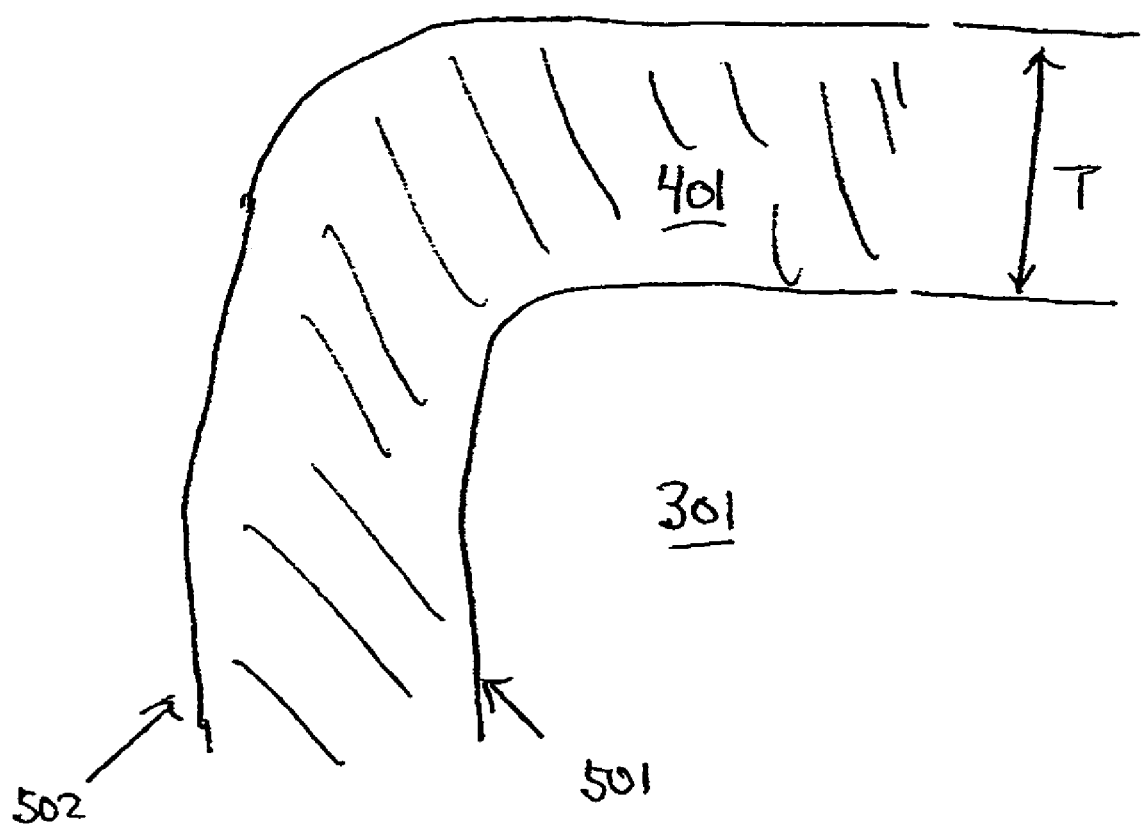
FIG. 5 shows a close-up view of a portion of the highlighted graphical object shown in FIG. 4, according to one embodiment of the present invention.

FIG. 5 shows a close-up view taken from area A-A shown in FIG. 4. The halo may be of a predetermined thickness (T), such as a certain number of pixels (e.g., 8, 10, 12, 15, 20, etc. pixels) or a predetermined distance (e.g., 1/16th of an inch, 1/8th of an inch, 1/4 of an inch, etc.), and appears in the original color of the graphical object. As a result of using a predetermined thickness, the outer contour 502 of the halo 401 may follow the outer contour 501 of the graphical object 301. The contour 502 of the halo 401 may follow the outer contour 501 of the object 301 exactly, although a slight variation may occur due to the thickness of the halo 401. By following the contour 501, the selected graphical object will more closely resemble the original graphical object.

Figure 6:
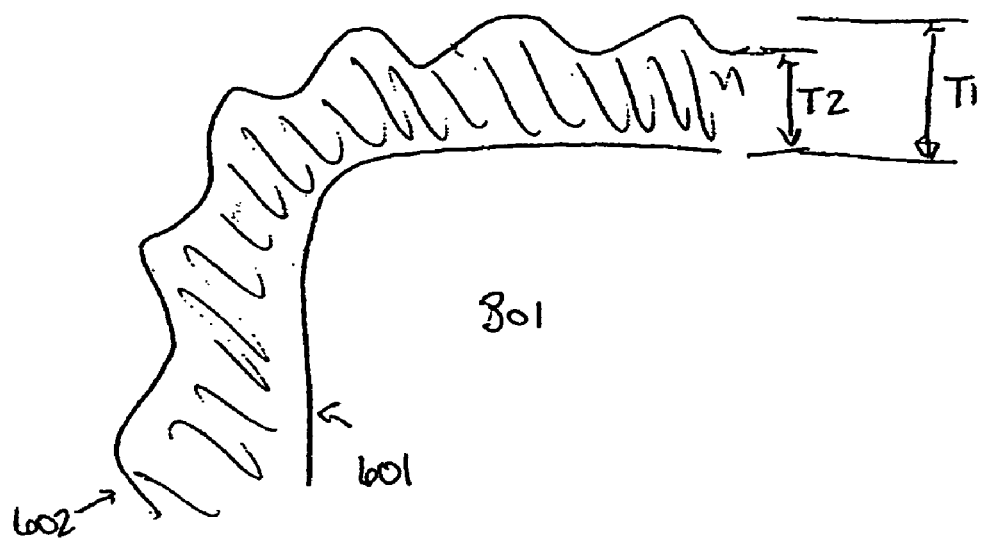
FIG. 6 shows a close-up view of a portion of the highlighted graphical object shown in FIG. 4, according to another embodiment of the present invention.

In alternative embodiments, the halo may have a varying thickness to give the selected object a more distinguished appearance. For example, as shown in FIG. 6, the thickness of the halo may simply vary to give the highlighted graphical object a glowing appearance. The variation may be periodic between two or more thicknesses (T1 and T2 ) (e.g., varying between 10 and 15 pixels every linear inch), or alternatively, may randomly vary among two or more thicknesses.

Figure 7:
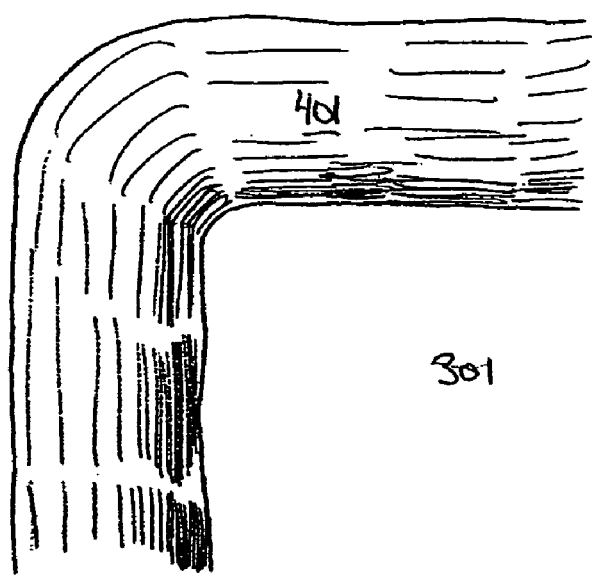
FIG. 7 shows a close-up view of a portion of the highlighted graphical object shown in FIG. 4, according to yet another embodiment of the present invention.

As shown in FIG. 7, the halo may also vary its color and/or pattern value. For example, the halo color and/or pattern may be darker near the outer edges of the graphical object body 301, and become lighter near the outer edges of the halo 401. At the outer edges of halo 401, the color/pattern may be a lighter version of the same color (e.g. light green becoming green, grey becoming black, etc.), or of the pattern (e.g., less concentrated stripes and/or shading, etc.). This variation in the halo color helps give the highlighted graphical object a glowing appearance. Other variations may also be used. For example, the color and/or pattern may become darker towards the outer edge 502 of the halo, or may vary in darkness throughout. The process by which an example halo may be generated and rendered for display will be described further below with respect to FIGS. 10-15.

As another feature, some embodiments of the present invention allow the user to select the graphical object by selecting its halo. For example, a pen-based computing device may allow users to select graphical objects by placing the stylus on or over the highlighted graphical object. Similar selections may be made using a mouse that moves an onscreen pointer, pressing a sequence of keys on a keyboard, or any other form of GUI interaction. With such a selectable halo, graphical objects having a thin appearance (e.g., a single hand-drawn stroke or line) may be easily selected after they have been highlighted.

One advantage offered by some embodiments of the halos described above is apparent in situations where multiple graphical objects appear on the display screen, and overlap one another. If one of these graphical objects is selected, while the other is not, the transparent, or "hollow," body of the selected graphical object, together with its halo, clearly set the object apart from the other unselected graphical object(s).

Figure 8:
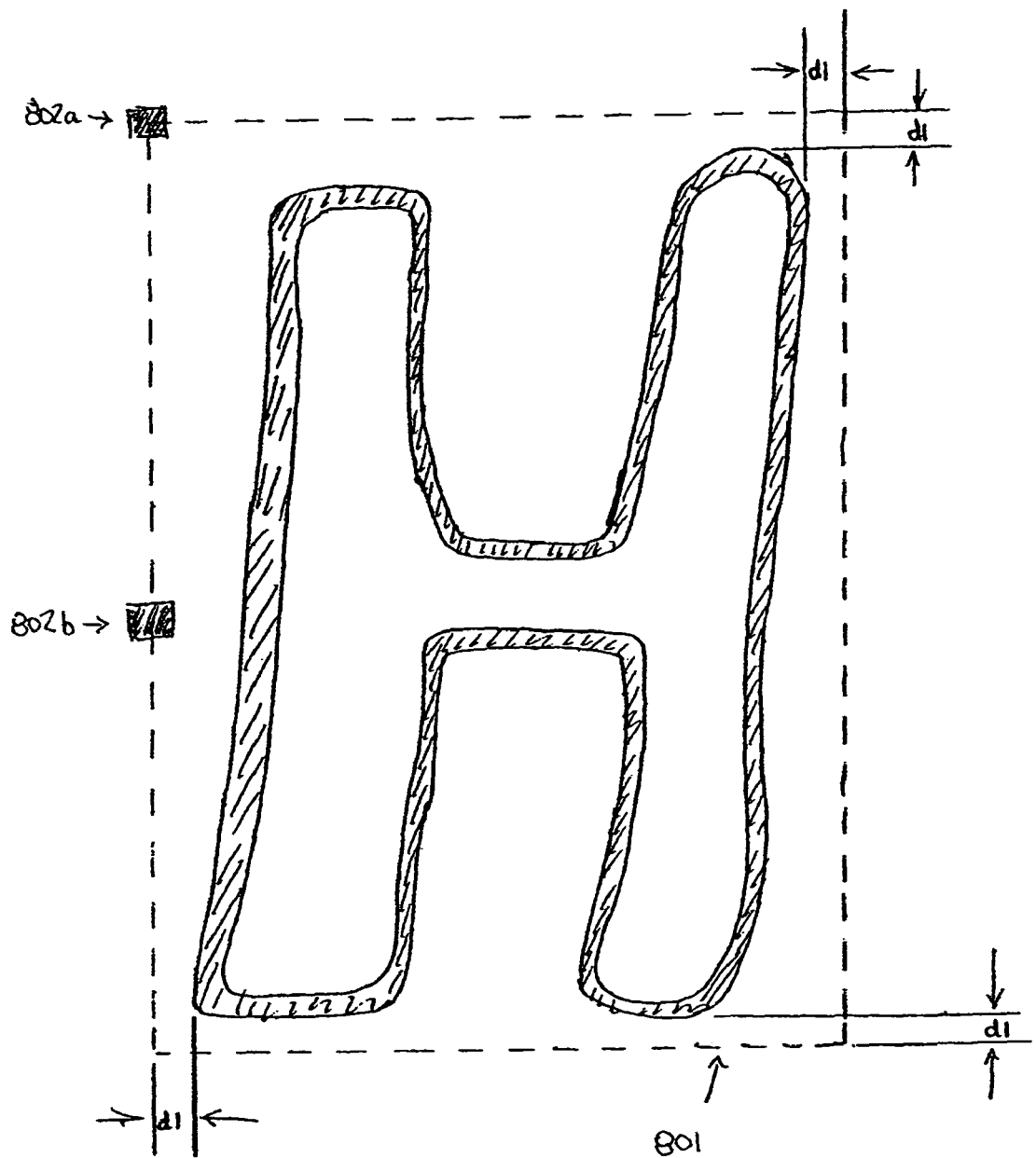
FIG. 8 shows a highlighted graphical object according to a further embodiment of the present invention.

In a further aspect, the highlighted graphical object may also be surrounded by a bounding box. FIG. 8 shows an example of a highlighted graphical object having a rectangular bounding box 801. There are several advantages to a bounding box. For example, the box helps further indicate to the user that a graphical object has been selected, and may also identify with greater particularity the object (or objects) that are actually selected. The bounding box 801 may be defined such that it is a rectangular shape whose dimensions depend on the size of the graphical object. In the example shown in FIG. 8, the borders of the box 801 are horizontal and vertical, and are located a predetermined distance (d1) to the left, right, above and below the graphical object. In one exemplary embodiment, the distance (d1) is a set number of pixels, such as 8, 10, 12, 15, or 20. The borders shown in FIG. 8 are rendered using a dashed line, but any other line type and/or color may be used.

In alternate embodiments, the bounding box 801 need not be rectangular, and need not be a box, at all. For example, the bounding box may actually be implemented as any other shape, such as a circle, oval, diamond, etc. to surround the graphical object being highlighted.

In further embodiments, the bounding box 801 may include one or more selection handles 802a,b that may be used to interact with the object for further handling, such as moving and/or resizing the object. Selection handles 802a may be located at the corners of the bounding box 801, and/or at other locations 802b along the borders of the box. By selecting one of these handles (e.g., using a mouse-controlled pointer, stylus, or any other GUI selection method), the user may resize the graphical object, and/or select the graphical object for further processing/editing. In some embodiments, the bounding box border distance (d1) is configured to be of sufficient size such that the selection handles do not overlap or obscure any portion of the highlighted graphical object.

III. Movement of the Graphical Object

In one aspect, the user may move a highlighted graphical object through various portions of the GUI. This movement may be made, for example, by the user selecting the graphical object in a pen-based computing system by placing a stylus on the graphical object, pressing a button on the stylus to select the graphical object, and then moving the stylus across a display screen to the desired new location. During this movement, some embodiments of the present invention may display a moving version of the graphical object at a location corresponding to the user's device. In this manner, the user is given feedback regarding the movement he/she is carrying out, as well as the system's acknowledgement that the move operation has begun.

Figure 9A:
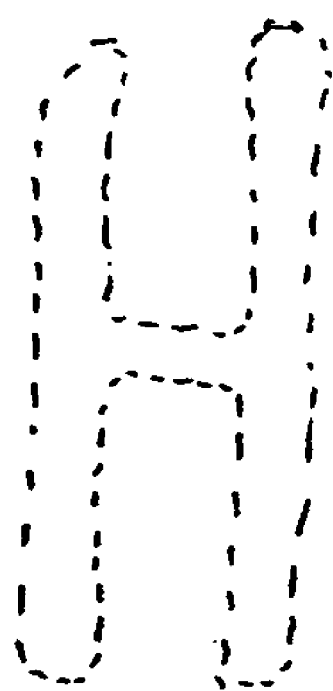
FIGS. 9a-9b show alternate embodiments of moving graphical objects according to further embodiments of the present invention.

The moving version of the graphical object may appear as a simple outline of the object, as shown in FIG. 9a, to assist the user in determining placement of the graphical object. The outline may be of any line type and/or color, and in some embodiments, is a thin dotted line. Using a simple dotted outline as the moving version allows the user to see background object(s) during the movement process.

Figure 9B:
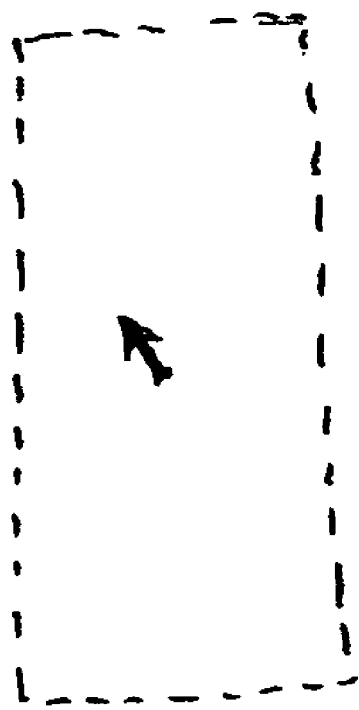

The moving version may alternatively appear as a bounding box with a pointer or cursor, as shown in FIG. 9b. In some embodiments, the dimensions of the bounding box are the minimum dimensions necessary to enclose the graphical object. Using these minimum dimensions helps convey to the user the amount of space needed by the object. Alternatively, the dimensions of the box may be greater than the minimum. Using a simple bounding box may simplify the processing required for rendering the box during the movement process, and the presence of the cursor may help make clear that the object is being moved. Alternative embodiments of this moving version may simply have the bounding box, without the cursor.

As a further alternative, the moving version of the graphical object may simply be a copy of the graphical object rendered in a different color and/or pattern, such as using a lighter shade of the color, or a fainter version of the color that allows more transparency. Using a lighter or fainter color for the moving version of the graphical object, the user is provided with a clear indication of what will be obscured upon repositioning of the object.

The moving versions described above may be rendered with its own bounding box and/or selection handles, as described above, to further indicate that a movement process has begun.

In some embodiments, the GUI may include several distinct areas in which different color contrasts are used. For example, a GUI may have a first area in which black graphical objects appear against a white background, and a second area in which red graphical objects appear against a green background. Upon selection in the first area, a graphical object originally appearing in black ink may be replaced with a transparent body and a black halo. The user may move this object from the first area to the second area. In some embodiments, upon movement to this second area, the color of the highlighted graphical object's body and halo remain the same. In this manner, any meaning associated with the color of the underlying graphical object is preserved in the new GULI area. Alternatively, the highlighted graphical object's halo may change in color to that of the second area (in this example, red).

IV. Example Process of Highlighting Graphical Object

Figure 10:
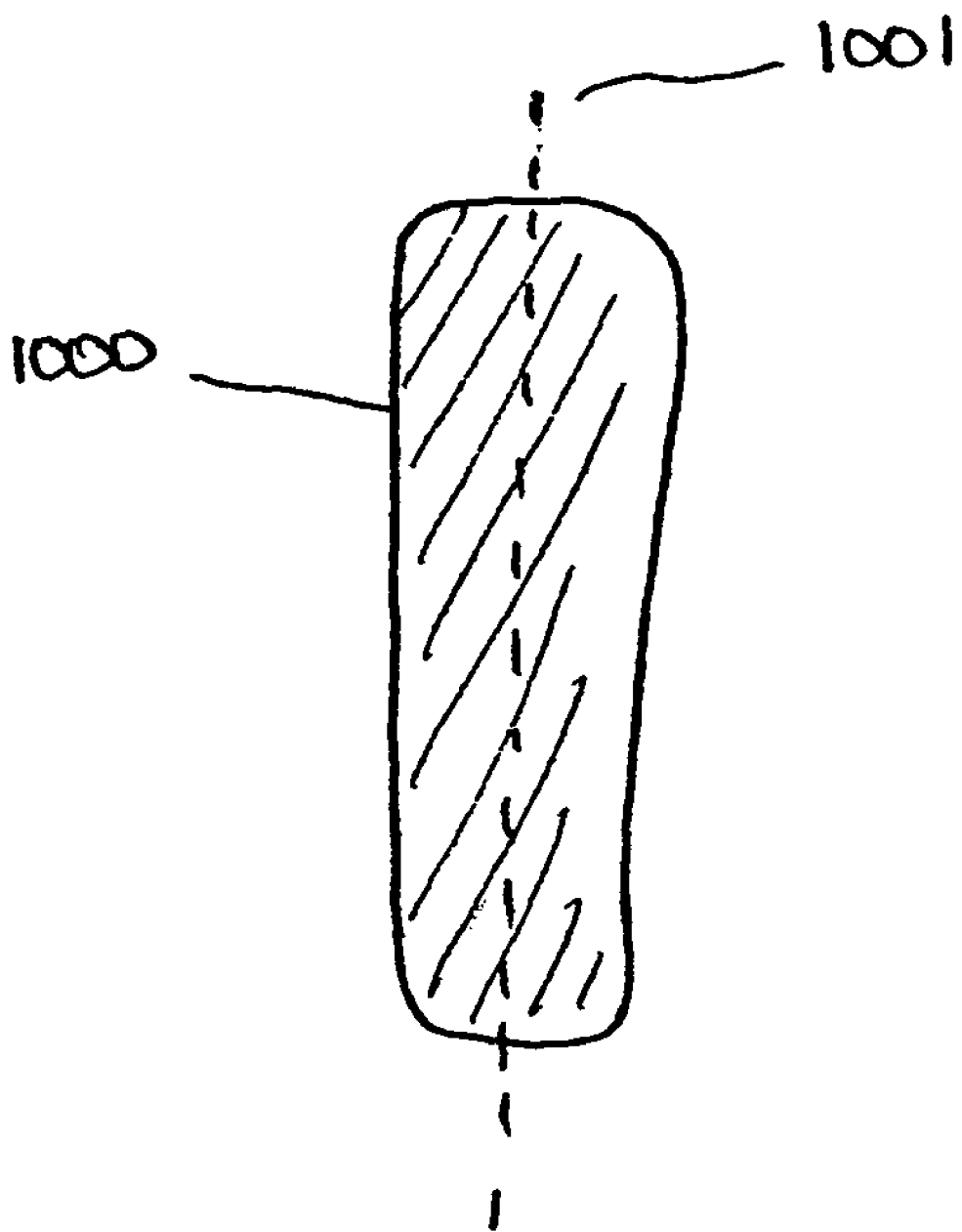
FIG. 10 shows an example of a graphical object to be highlighted according to aspects of the present invention.

FIGS. 10-15 depict example processes that may be used to generate and render an example highlighted graphical object according to one or more of the embodiments described above. To simplify the explanation, FIG. 10 depicts an example graphical object 1000 that may be highlighted. The object may be of any type of onscreen image, and one example would be a stroke of handwritten "ink" drawn by the user using a stylus and a touch-sensitive display. The stroke itself may follow a center line 1001, and may vary in thickness or width. This variation may arise from a variety of causes, such as the user varying the pressure placed upon the stylus while drawing the stroke.

Figure 11:
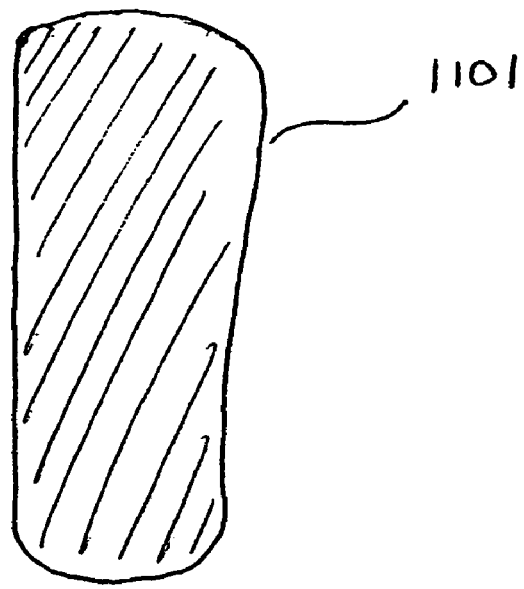
FIGS. 11-13 show example steps in the creation of a highlighted graphical object according to one embodiment of the present invention.
Figure 12:
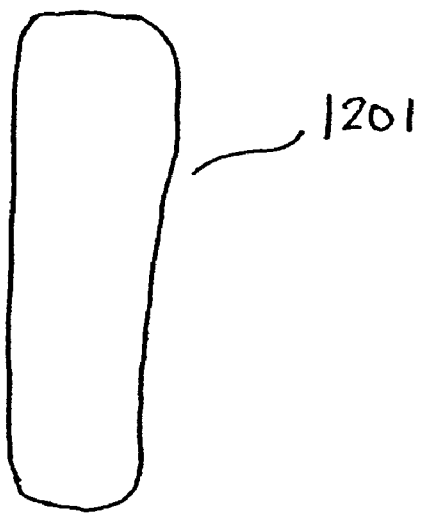
Figure 13:
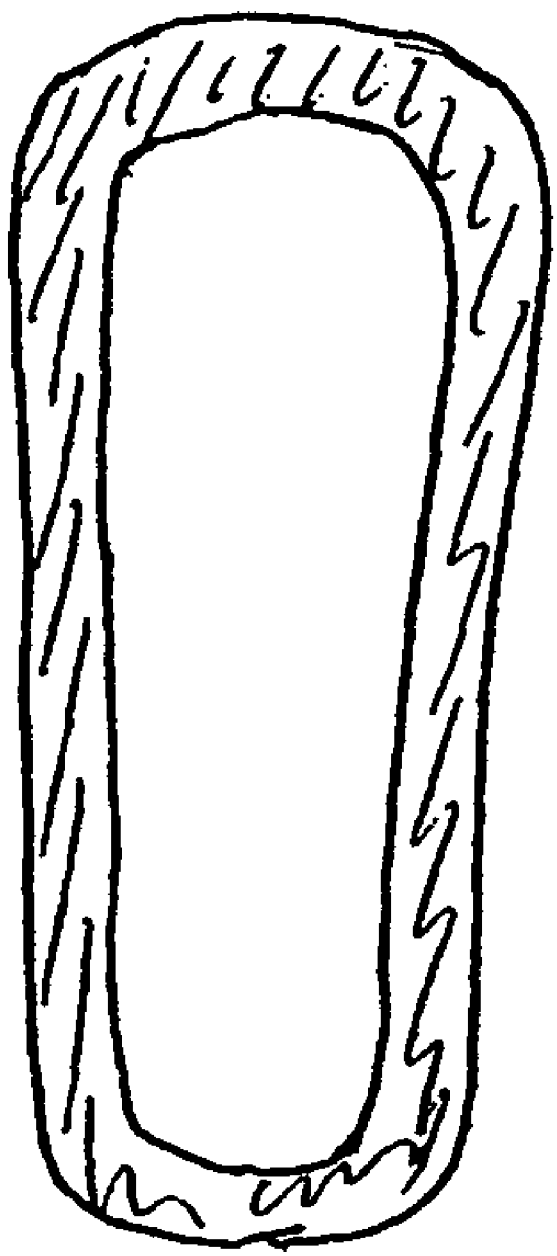

FIGS. 11-13 depict example steps that may result in a graphical halo such as the one shown in FIG. 5. To create such a halo, the computer display system may first generate an enlarged version 1101 of the original graphical object, as shown in FIG. 11. The enlarged version 1101 may be of the same color as the original graphical object, and have its width and/or height increased by a predetermined size, such as 0.125 inches, 10 pixels, etc., or by a predetermined percentage, such as 5%, 10%, etc.

Increasing the dimensions by a predetermined amount advantageously allows consistency in the visual appearance of highlighted graphical objects. On the other hand, increasing the dimensions by a percentage may allow for a more dynamic visual experience. In some embodiments, a graphical object comprised of lines may be enlarged by having its lines widened by the predetermined amount. The enlarged version 1101 in FIG. 11 has been slightly increased in both height and width.

The computer display system may generate the enlarged version 1101 in an internal memory or display buffer, and need not actually display or render the enlarged version on screen immediately.

The computer display system may also generate another copy 1201 of the original graphical object 1000, where the copy 1201 has the same dimensions as the original object. The copy 1201 may be assigned a color value that is the background color value of the area on which the original object was displayed. The copy 1201 may then be overlaid upon the enlarged version 1101, resulting in the highlighted graphical object shown in FIG. 13. The enlarged version 1101 and copy 1201 need not be displayed onscreen prior to this "overlaying," and may simply be constructed in a memory or video buffer of the system.

In some embodiments, the color value of the copy 1201 will be such that background images, text, and/or objects may be visible. For example, if the display system supports the use of transparency as a color value, then the copy 1201 may be assigned this transparency color value, and when this copy 1201 is overlaid upon the enlarged version, the interior of the enlarged version becomes transparent in color, allowing background images to appear. This effect may be achieved even in systems that do not directly support the use of such transparency values. For example, rather than simply assign the copy 1201 to a single background color, the copy 1201 may have the appearance of the graphical image, text, etc. that would have appeared directly behind the original object 1001. Alternatively, the copy 1201 may be assigned a predetermined color, such as white, to simplify the processing required to generate the halo. Using the background minimizes the amount of visual real estate that is obscured by the halo, while using a predetermined color simplifies the processing involved. One additional advantage to allowing the background pattern to show lies in the readability of text that already has another highlighting (such as a yellow highlight) associated with it. If the text had already been highlighted, then allowing this highlighting to show through the hollow body of the halo helps preserve the meaning associated with that highlighting. The user is still able to see that the selected text had the highlight associated with it.

Figure 14:
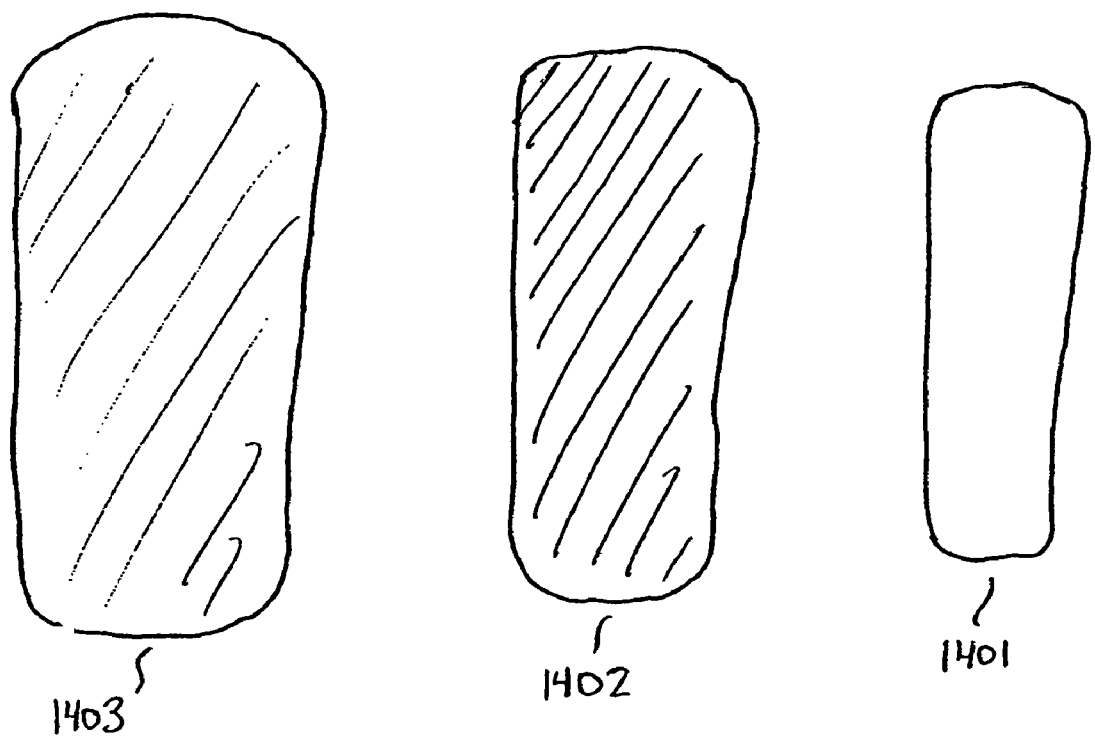
FIGS. 14-15 show example steps in the creation of a highlighted graphical object according to one embodiment of the present invention.
Figure 15:
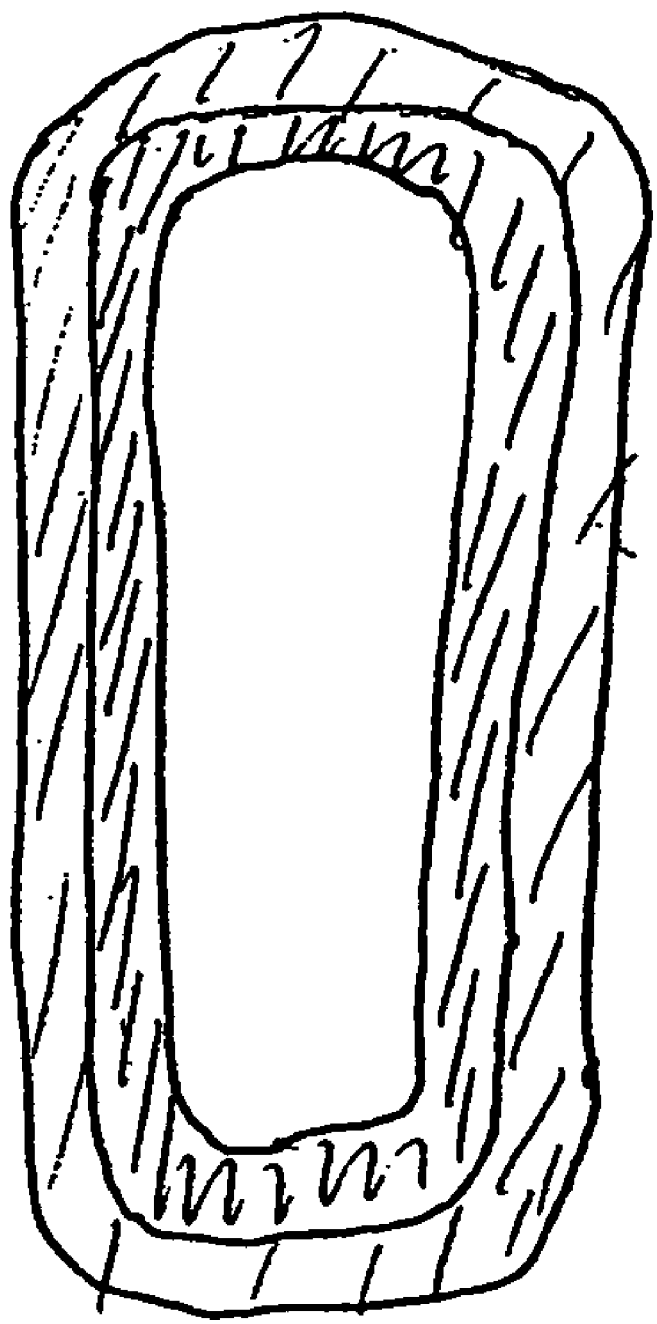
Figure 16:
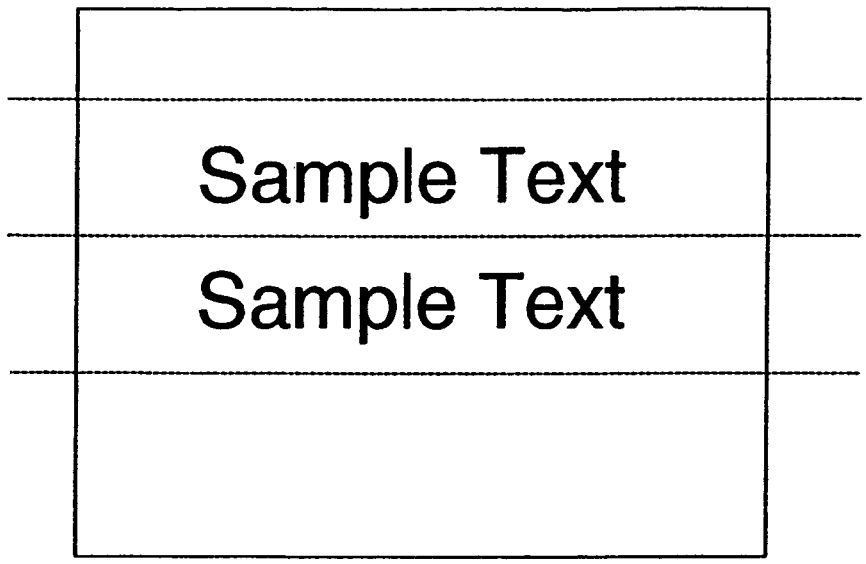
FIGS. 16-17 show an example of highlighted text in the prior art.
Figure 17:
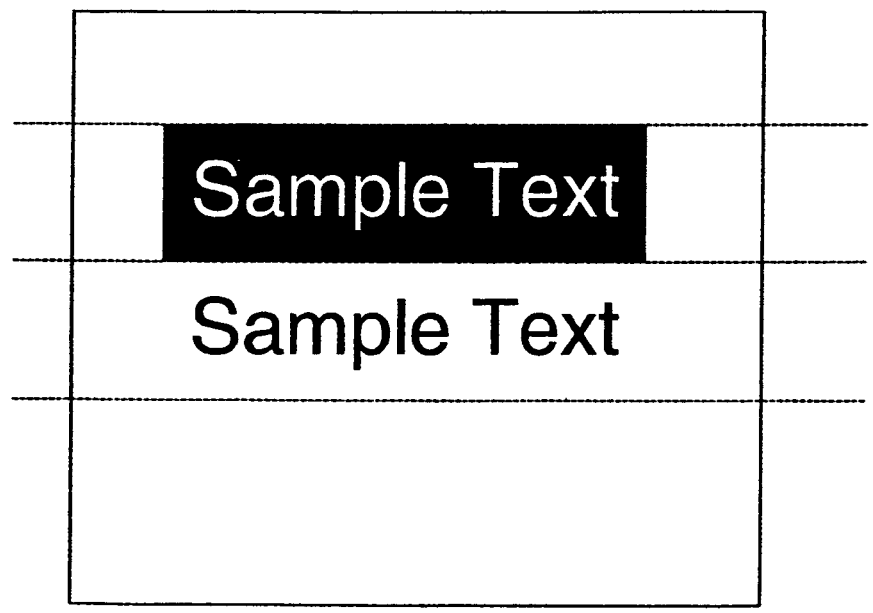
Figure 18:
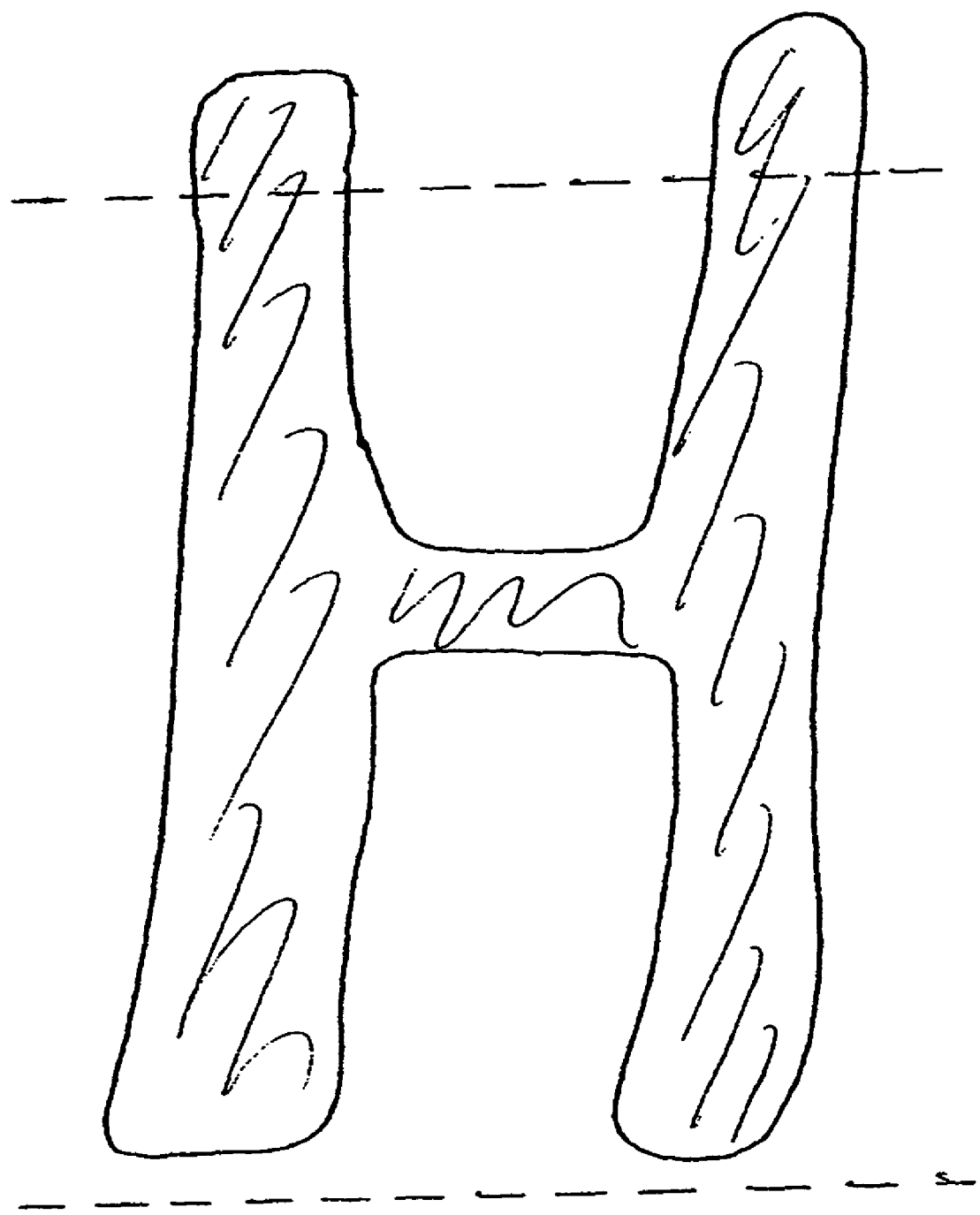
FIG. 18 shows an example graphical object.
Figure 19A:
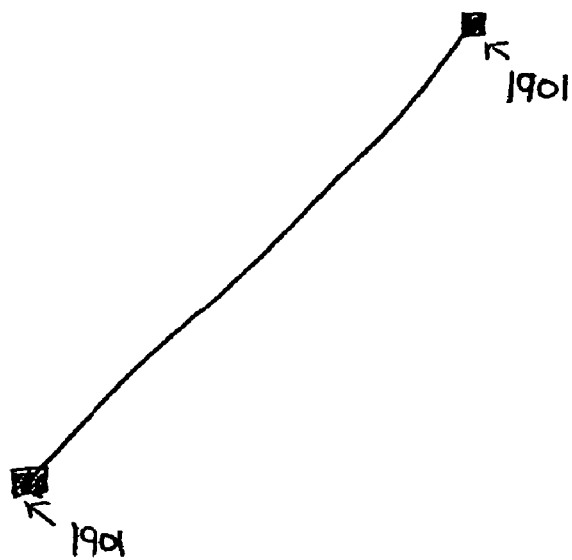
FIGS. 19a-b show an example of a highlighted line in the prior art.
Figure 19B:
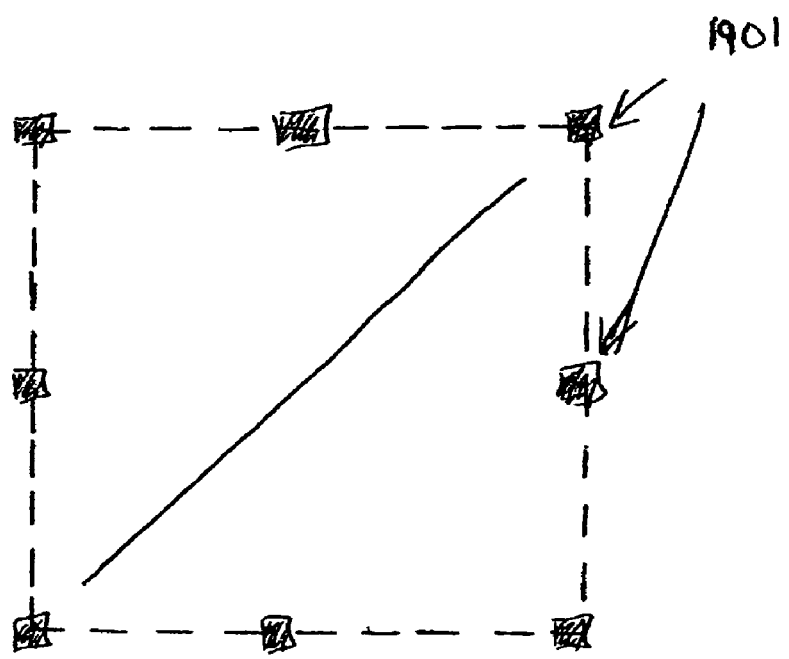

A similar process of "overlaying" versions may be used to create the "glowing" effect of the halo shown in FIG. 7. As shown in FIG. 14, multiple versions of the object may be created. In some embodiments, one version 1401 is a copy, much like the copy 1201 shown in FIG. 12. One or more enlarged versions may also be created, where each version is of a slightly different size and color. For example, version 1402 is slightly larger in dimension than version 1401, and is of the color of the original object. Another version 1403 is slightly larger than version 1402, and is of a slightly lighter color. This lighter color may be a lighter shade than that of version 1402. Alternatively, version 1403 may have the same color, but a greater transparency value, than version 1402. As with the FIG. 13 halo, the various versions shown in FIG. 14 may be overlaid upon one another to result in the highlighted object shown in FIG. 15. Although the FIG. 15 example uses two enlarged versions, other embodiments may use more enlarged versions, with slighter differences in size and/or color between them, to create a smoother "glowing" effect. In one embodiment, four such enlarged versions are used.

In further embodiments, the original graphical object 1000 may have its width changed before the various copies and enlarged versions are created. For example, the object 1000 may originally have a varying width, but for purposes of generating the halo, it may have its width changed to that of a constant value. This constant value may be predefined, or may simply be the average width calculated along various points of the center line 1001. Using such a constant width may simplify the processing required to generate the various copies and enlarged versions, and is particularly useful when the original graphical object was nearly of constant width to begin with (e.g., if the original graphical object was constructed using a linear stroke of a stylus).

In some embodiments, the various steps of "overlaying" described above may be achieved using a version of the object(s) stored in a memory or display buffer. The overlaying may be performed on a pixel-by-pixel basis by replacing the individual pixels of a portion of one image with those of another image.

As an alternative, the graphical halo may be generated using the outer contour of the graphical object to define the contour that is to be followed by the halo. To generate the halo, the computer system may calculate the path to be taken by the halo, and render just that path on the screen to create the halo effect. The halo may be rendered by tracing a single line around the contour. In such an embodiment, no processing is necessary for the "hollow" portion of the halo, but greater processing is needed to trace the path. In some embodiments, the halo outline may be anti-aliased for improved resolution.

Figure 20A:
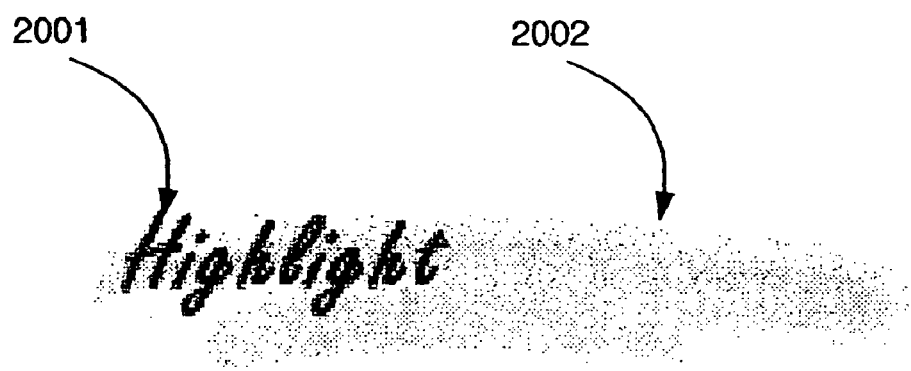
FIGS. 20a-b are photographic examples of one embodiment of the present invention.
Figure 20B:
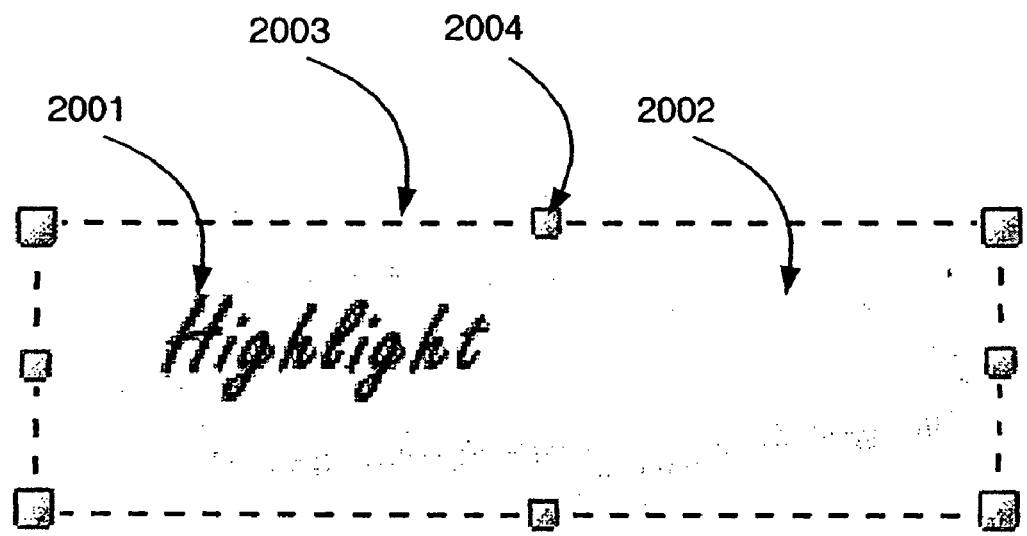

FIGS. 20*a-b* are photographic images of one example embodiment. In FIG. 20*a*, a handwritten word "highlight" 2001 is shown having a highlighting 2002. Highlighting 2002 may resemble the traditional highlighting generated using a hand-held highlighter marker. FIG. 20*b* shows an example in which the highlighting 2002 has been selected by the user, and exhibits a hollow selection feedback described above. In the depicted example, there is also a bounding box 2003 having selection handles 2004.

Figure 21A:
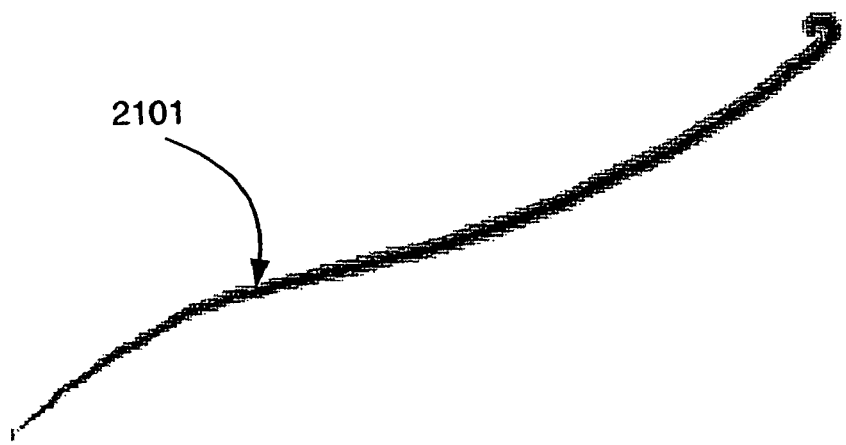
FIGS. 21a-b are photographic examples of another embodiment of the present invention.
Figure 21B:
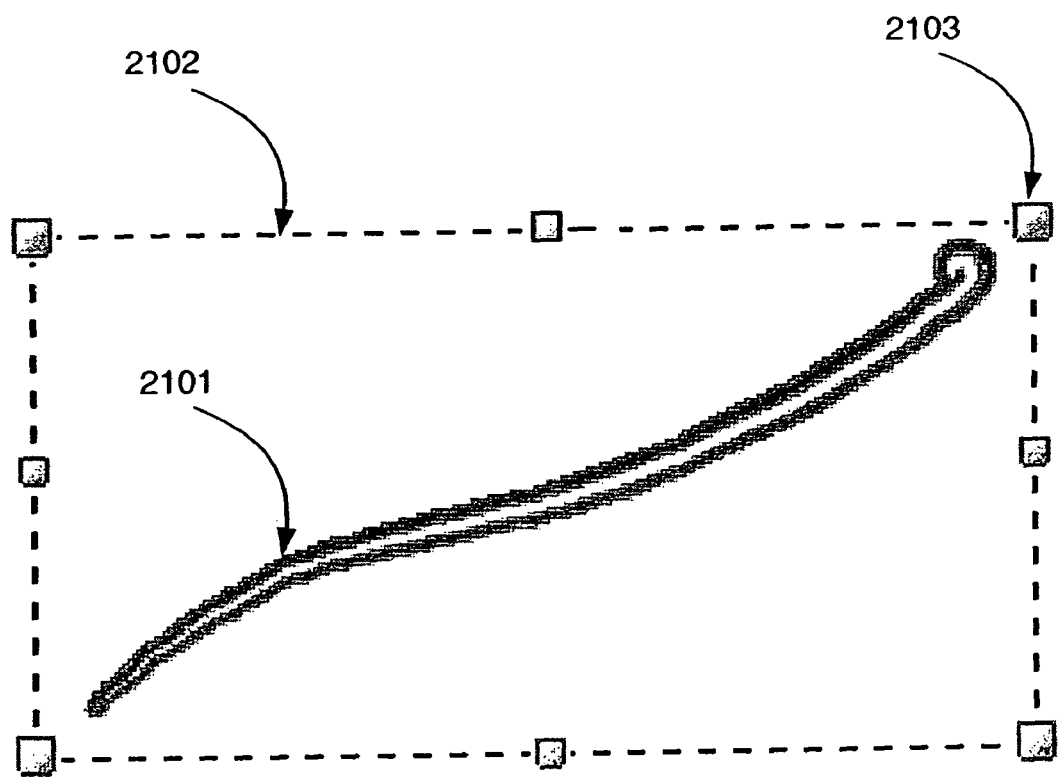

FIGS. 21*a-b* are photographic images of another example embodiment. In FIG. 21*a*, there is shown a handwritten stroke 2101. In FIG. 21*b*, the stroke 2101 has been selected, and exhibits a hollow selection feedback described above. This depicted example also includes a bounding box 2102 having selection handles 2103. The interior of the bounding box 2102 may be transparent, to permit the background to show through.

V. Conclusion

Various embodiments and aspects of the present invention have been described above, and it will be understood by those of ordinary skill that the present invention includes within its scope all combinations and subcombinations of these embodiments and aspects. The full scope of the present invention should only be limited by the claims, which read as follows:

The invention claimed is:

1. A method for altering the appearance of an original highlighted graphical object on a display and preserving the meaning of the existing highlighting, comprising the steps of:
   receiving a user selection of the original graphical object;
   generating a transparent copy of the original graphical object;
   generating a first enlarged version of the original graphical object;
   overlaying the transparent copy of the original graphical object on the first enlarged version of the original graphical object creating a combined graphical object with a transparent graphical object interior;
   overlaying the combined graphical object on the original graphical object, thereby allowing the original graphical object and highlighting to be visible through the combined graphical object, wherein the combined graphical object is selectable such that a user selection of the combined graphical object causes selection of the original graphical object;
   defining a bounding area, wherein the bounding area comprises a shape that surrounds the original graphical object and the combined graphical object, wherein a thickness of the bounding area periodically varies between two or more thickness, thereby providing an indication that the original graphical object has been selected; and
   displaying the bounding area.

2. The method of claim 1, further comprising the step of assigning the copy of the graphical object a transparent color value.

3. The method of claim 1, further comprising the steps of:
   generating one or more additional enlarged versions of the graphical object; and
   overlaying the copy of the graphical object, the first enlarged version of the graphical object, and the one or more additional enlarged versions of the graphical object.

4. The method of claim 3, wherein the one or more additional enlarged versions of the graphical object are larger than the first enlarged version of the graphical object.

5. The method of claim 3, wherein the one or more additional enlarged versions of the graphical object have color values different from a color value of the first enlarged version of the graphical object.

6. A method of highlighting an original graphical object displayed on a graphical user interface (GUI), wherein the original graphical object comprises an icon, an image, a symbol, a menu, or a prompt, the method comprising:
   receiving a user selection of the original graphical object, wherein the original graphical object is initially located in a first area of the GUI;
   generating an enlarged copy of the graphical object, wherein the enlarged copy is made semi-translucent, and further wherein a color of the enlarged copy is based on a background color of the first area;
   creating a highlighted object by overlaying the enlarged copy over the original graphical object to create a selectable halo around a circumferential portion of the original graphical object, wherein a user selection of the halo operates as a user selection of the original graphical object, and wherein a thickness of the selectable halo periodically varies between two or more thicknesses
   determining that the user has begun to move the graphical object;
   displaying a moving version of the highlighted object while the user moves the highlighted object to a second area of the GUI, wherein the moving version of the highlighted object is an outline of the highlighted object; and displaying the highlighted object in the second area, wherein the color of the halo is altered based on a background color of the second area.

7. The method of claim 6, wherein the enlarged graphical object is a different color than the original graphical object so that the halo is of the color of the enlarged graphical object.

8. The method of claim 6, wherein the thickness of the halo varies periodically between two or more thicknesses.

9. The method of claim 6, wherein the graphical object is text.

10. The method of claim 6, further comprising applying the method of claim 6 to a string of graphical objects.

11. The method of claim 8, wherein the thickness of the halo varies periodically between ten pixels per linear inch and fifteen pixels per linear inch.

12. The method of claim 6, wherein the thickness of the halo varies randomly among two or more thicknesses.

* * * * *